United States Patent
Nichols et al.

(10) Patent No.: US 9,796,186 B1
(45) Date of Patent: Oct. 24, 2017

(54) TRANSFORM MAP AT PRINTER CARTRIDGE

(71) Applicant: HEWLETT-PACKARD DEVELOPMENT COMPANY, L.P., Houston, TX (US)

(72) Inventors: Stephen J. Nichols, Vancouver, WA (US); Jay S. Gondek, Camas, WA (US); Jefferson P. Ward, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/660,063

(22) Filed: Jul. 26, 2017

Related U.S. Application Data

(63) Continuation of application No. 15/329,045, filed as application No. PCT/US2014/051684 on Aug. 19, 2014.

(51) Int. Cl.
*B41J 2/175* (2006.01)

(52) U.S. Cl.
CPC ....... *B41J 2/17543* (2013.01); *B41J 2/17546* (2013.01)

(58) Field of Classification Search
CPC . B41J 2/17543; B41J 2/17546; H04N 1/6019; H04N 1/603; H04N 1/6097; G06K 15/027; G06K 15/1868; G06K 15/1878; G03G 21/1878; G03G 15/0863; G03G 21/1889
See application file for complete search history.

(56) References Cited

U.S. PATENT DOCUMENTS

| | | | |
|---|---|---|---|
| 6,158,837 | A | 12/2000 | Hilton |
| 7,106,474 | B1 | 9/2006 | Haikin et al. |
| 7,414,751 | B2 | 8/2008 | Yamazaki |
| 7,495,786 | B2 | 2/2009 | Sugiura |
| 7,663,781 | B2 | 2/2010 | Song et al. |
| 7,777,914 | B2 | 8/2010 | Seko |
| 2002/0075344 | A1 | 6/2002 | Usui et al. |
| 2004/0126167 | A1 | 7/2004 | Roosen et al. |
| 2005/0073731 | A1 | 4/2005 | Deer et al. |
| 2007/0176957 | A1 | 8/2007 | Ahne et al. |

(Continued)

FOREIGN PATENT DOCUMENTS

| | | |
|---|---|---|
| CN | 102187283 | 9/2011 |
| DE | 102012212661 | 1/2013 |
| EP | 1394671 | 3/2004 |

OTHER PUBLICATIONS

Bin et al.; "Research on Color Conversion Model Based on Looking-up Table in FM Halftoning Technique"; Dec. 12-14, 2008; pp. 113-116.

(Continued)

*Primary Examiner* — Alessandro Amari
*Assistant Examiner* — Roger W Pisha, II
(74) *Attorney, Agent, or Firm* — Fabian VanCott

(57) ABSTRACT

A transform wrapper is stored on a memory device and the memory device may be included in a printer cartridge. The transform wrapper may dynamically build a transform map for a printer based on metadata stored at the memory device. The metadata may indicate at least one of a type of depositing material, transform map, print media and printer.

19 Claims, 2 Drawing Sheets

(56) References Cited

U.S. PATENT DOCUMENTS

| | | |
|---|---|---|
| 2009/0190194 A1 | 7/2009 | Deer et al. |
| 2010/0271642 A1 | 10/2010 | Huang et al. |
| 2011/0187771 A1 | 8/2011 | Helterline et al. |
| 2013/0028648 A1 | 1/2013 | Dufort |
| 2014/0003826 A1 | 1/2014 | Homma et al. |
| 2016/0112606 A1 | 4/2016 | Gondek |
| 2016/0154957 A1 | 6/2016 | Jeran |
| 2017/0157941 A1* | 6/2017 | Nichols ................ B41J 2/17546 |
| 2017/0225475 A1* | 8/2017 | Nichols ................ B41J 2/17543 |

OTHER PUBLICATIONS

<http://ieeexplore.ieee.org/xpl/articleDetails.jsp?tp=&arnumber=4723209.

* cited by examiner

TRANSFORM MAP AT PRINTER CARTRIDGE

BACKGROUND

Output devices such as printers may implement a subtractive color model, like a cyan, magenta, yellow, and black (CYMK) color model, while input devices such as computer monitors, mobile phones, and other input devices may implement an additive color model, like an red, green and blue (RGB) color model.

To output data from an input device, such as a graphic, text or a combination thereof, output devices may convert the additive color model into a subtractive color model via a print color transform. Manufacturers and/or vendors are challenged to provide print color transform such that graphics and/or text are outputted from output devices, like a printer, with more accurate color representation.

BRIEF DESCRIPTION OF THE DRAWINGS

The following detailed description references the drawings, wherein.

DETAILED DESCRIPTION

Specific details are given in the following description to provide a thorough understanding of examples. However, it will be understood that examples may be practiced without these specific details. For example, systems may be shown in block diagrams in order not to obscure examples in unnecessary detail.

Print color transforms may be dependent on a particular ink or toner formulation. Therefore, it may be desirable to provide color tables along with the printer inks or toners, rather than include them in printer firmware or a printer driver. However, compared to storing color tables in printer firmware, the management of color data in printer supplies may be more complicated. For instance, a customer may have installed a mix of supply versions in the printer, and different supplies may have changes in inks and color tables and may support different media. In addition, those supplies may be used by multiple printers, or be used in printers that have not yet been developed.

Accordingly, examples herein may include a system embedded in the print cartridge memory, which allows for multiple versions and permutations of inks, color tables, print media, and/or printers. In one example, a printer cartridge may include a memory device. A transform wrapper may be stored on the memory device. The transform wrapper may dynamically build a transform map for a printer based on metadata stored at the memory device. The metadata may indicate at least one of a type of depositing material, transform map, print media and printer.

The transform wrapper may use the metadata for building transform data from more primitive data elements, or other existing transforms. This data transform or encoding may provide flexibility to handle the different versions and permutations that may arise, such as changes in inks, media support, color tables, and printers. For example, including a color table map on a printer cartridge may offer improved ink/toner types to customers that didn't exist at a time the original product was manufactured. Also, examples may be able to correct color tables in printers in the field for errors discovered after the start of manufacturing.

Further, examples may correct color tables due to changes in media and add support for media types that didn't exist at the time the product was manufactured. Moreover, examples may introduce inks/toners with different color characteristics as well as introduce different improved color tables for a single color, without requiring the customer to replace all ink/toner supplies to correct for errors. Examples may further reduce a required memory storage space on the printer cartridge for storing color tables.

Figure 1:
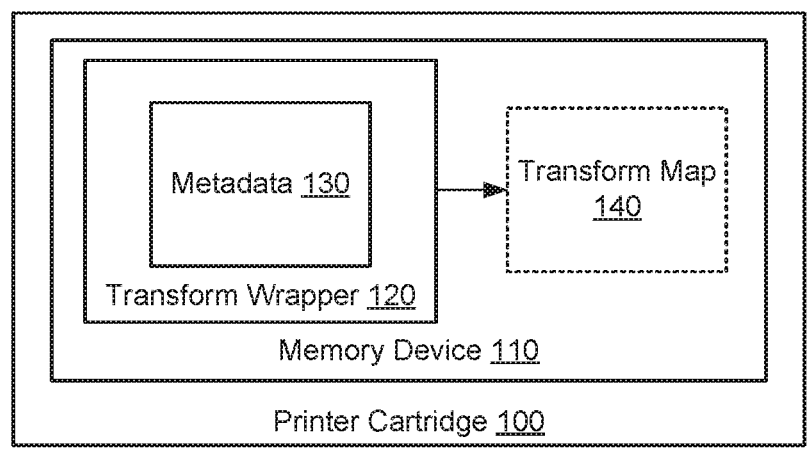
FIG. 1 is an example block diagram of a printer cartridge including a transform wrapper to build a transform map.

Referring now to the drawings, FIG. 1 is an example block diagram of a printer cartridge 100 including a transform wrapper 120 to build a transform map 140. The printer cartridge 100 may be any type of cartridge to store a depositing material. Example depositing materials may include ink, toner, plastic, polymer, powder metal, alloy and the like. In one example, the printer cartridge 100 may be an ink cartridge that contains liquid ink for use with an inkjet printer. In another example, the printer cartridge 100 may be a toner cartridge that contains dry toner powder for use with a laser printer.

The printer cartridge 100 is shown to include a memory device 110. The memory device 110 may be any electronic, magnetic, optical, or other physical storage device. For example, the memory device 110 may be a Random Access Memory (RAM), an Electrically Erasable Programmable Read-Only Memory (EEPROM), a Read-only memory (ROM), flash memory, a storage drive or the like.

The memory device 110 is shown to store a transform wrapper 120, where the transform wrapper 120 includes metadata 130. The transform wrapper 120 may refer to any type of container or wrapper format, such as a metafile format that describes how different data elements and metadata coexist in a file. The term metafile may refer to a file format that can store multiple types of data. The term metadata 130 may include structural metadata and/or descriptive metadata. Structural metadata may refer to the design and specification of data structures, such as a container of data. Descriptive metadata may refer to individual instances of application data, such as the data content.

The transform wrapper 120 may dynamically build a transform map 140 for a printer (not shown), such as laser or inkjet printer, based on the metadata 130 stored at the memory device 110. The metadata 130 may indicate a type of the depositing material, transform map, print media and printer. The metadata 130 will be explained in greater detail below with respect to FIG. 2.

The transform map 140 may be a type of color table and/or map. As explained above, a color table may be used to convert between different color models. For example, before an input image can be printed as a physical output, the input additive color model, such as RGB, may be converted to an output subtractive color model, such as CMYK. This may be done using a color table that transforms or converts RGB color data into CMYK color data. Examples of RGB color models may include sRGB, Adobe® RGB, scan RGB, and the like. However, examples are not limited to the RGB and CYMK color models, and may include any type of input and/or output color models, such as the Specifications for Web Offset Publications (SWOP) CMYK model and the International Commission on Illumination (CIE) L*a*b* color model.

In one example, the transform map 140 may correspond to a particular media type. For example, particular paper types, or particular paper colors may have corresponding transform maps 140. For example, one transform map 140 may correspond to plain paper and another transform map 140 may correspond to thicker paper, such as company letterhead, or bond paper. In another example, different degrees of output quality may have different transform maps 140. For example, a "draft" quality may have one transform map 140, and a "best" quality may have a different transform map 140. In yet another example, different input devices may have different corresponding transform maps 140. For example, different models of printers may have different corresponding transform maps 140.

While FIG. 1 show a single transform map 140, examples of the printer cartridge 100 may include a plurality of transform maps 140, such as for different types and/or versions of printers, media, depositing materials, users and the like. Moreover, while FIG. 1 shows a single printer cartridge 100, a plurality of the print cartridges 100 may be interfacing with a single printer. Each of these printer cartridges 100 may correspond to a different color.

For example, one of the printer cartridges 100 may include black ink and another of the printer cartridges may include cyan, magenta and yellow ink. In another example, one of the printer cartridges 100 may include black ink, another of the printer cartridges 100 may include cyan ink, yet another of the printer cartridges 100 may include magenta ink, and yet another of the printer cartridges 100 may include yellow ink. Further, each of these printer cartridges 100 may contain the transform map 140. Also, the transform map 140 of one of the printer cartridges 100 may be influenced by another of the printer cartridges 100, such as if different versions of the printer cartridges 100 are used together for a single printer.

Figure 2:
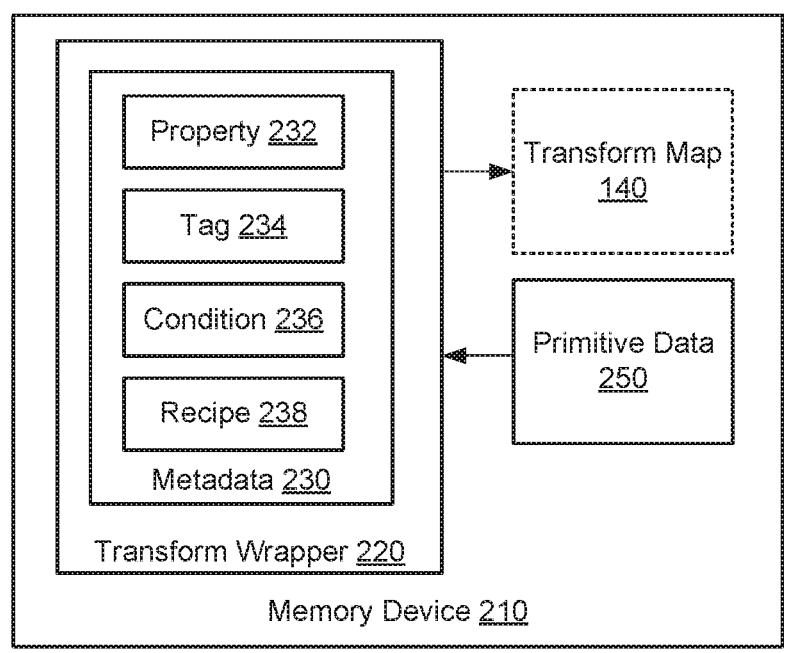
FIG. 2 is example block diagram of a memory device of FIG. 1.

FIG. 2 is example block diagram of a memory device 210 of FIG. 1. The memory device 210 of FIG. 2 may respectively include at least the functionality and/or hardware of the memory device 110 of FIG. 1. For instance, the memory device 210 is shown to include a transform wrapper 220, which further includes metadata 230. Here, the metadata 230 is further shown to include a property 232, tag 234, condition 236 and recipe 238. Further, the memory device 210 is shown to store primitive data 250. While FIG. 2 shows a single property 232, tag 234, condition 236 and recipe 238, examples may include a plurality of the properties 232, tags 234, conditions 236 and/or recipes 238. For instance, there may be separate tags 224 for the type of media, color space, supply family and the like.

The property 232 may describe primitive data 250 stored and/or generated by the printer cartridge 100. The primitive data 250 may include basic color information about the contents of the printer cartridge 100, such as a version, depositing material channel, and/or dimension of the printer cartridge 110. The dimension may include a channel and/or count of nodes of a color table. The channel may relate to a type of color. The node may indicate output colorant amount.

The tag 234 may provide an identification of the printer cartridge 100. For example, the tag 234 may include a color space, media type, print quality, printer platform, supply family, and the like. The condition 236 may restrict when the transform map 140 is available for use. For example, the condition 236 may specify which of a plurality of types of transform maps to use based on the tag 234. In one example, the condition 236 may include a Boolean expression of properties 232 and tags 234. For example, the condition 236 may be used to specify exception color tables that handle cases such as multiple printer platforms, or multiple ink color revisions.

The recipe 238 may include instructions for how to build the transform map 140 from at least one of an existing map and the primitive data 250. In one example, the instructions of the recipe 238 may utilize a stack model with reverse Polish notation (RPN) operators. The recipe 238 may use tags 234, to identify components, such as the existing map 238 and/or primitive data 250. Without tags 234, the recipe 238 would only be able to identify other components using their properties 232. This may be problematic as the same set of properties 232 may describe multiple components. For example, there may be multiple channel map components that have the same channel color (e.g. Cyan) and node count (e.g. 17-cubed) properties 232.

The transform map 140 may be a channel map and/or a color map. The color map may include a mapping for a plurality of colors while the channel map may include a mapping for only one of the plurality of colors. The color map may, for example, convert between the CYMK and RGB color models. The color map may include a plurality of the channel maps and the channel map may include the primitive data.

In one example, the recipe 238 may include instructions to select a plurality of the channel maps by matching at least one of the property 232 and the tag 234 of the primitive data and to combine the plurality of channel maps to build the color map. Moreover, the primitive data may not be selected if there is a mismatch with the tag 234 and/or property 232. For example, the tag 234 may match the media type, such as plain paper, but there may be a mismatch with the property 232, such as different colors. In this case, the primitive data may not be used because of the mismatch with the property 232, despite the matching tag 234.

Each of the channel maps may correspond to one of a plurality of depositing material colors of the printer. For instance, the recipe may 238 may define the operation for building a CMYK color map for color matching an RGB source color to a specific printer's plain paper, normal quality mode. Here, the condition 236 may be set to default, such that this color table will normally be used when referenced by a set (or subset) of matching tags 234. The recipe 238 may specify that color data tables for the individual inks, e.g. channel maps, are to be determined by referencing the properties 2232, tags 234 and conditions 236, pushed onto the stack, and then combined to build the CYMK color map.

In another example, the recipe 238 may include instructions to build the channel map based on a neutral axis, a set of seed nodes and a delta table included in the primitive data 250. The neutral axis may relate to a line extending from an origin of a three-dimensional color table to a node of the color table farthest from the origin. The set of seed nodes may correspond to nodes of a compressed color table. The delta table may indicate a difference between an interpolated color table node and a corresponding actual color table. For example, the recipe 238 may define the operation for building the cyan channel map by pushing elements onto a stack, such as the neutral axis, set of seed nodes, and the delta table.

The transform map 140 may be a base and/or modifier map. The base map may be used without any modification by the printer. The modifier map may be used to modify at least one of the base map and the primitive data. In one example, the recipe 238 may include instructions to build a new map based on the modifier map and the base map. The modifier map may be used to specify scale, specify offset and/or select replacement of data of the base map. For example, a draft-mode color table may be specified as a normal-mode color table modified with a small set of scale factors. For instance, the modifier map could be referenced by the base map's recipe 238 to change the node values in the base map.

Here, the conditions 236 may specify a printer platform and specific color ink versions. These conditions 236 may then be tested. If true, this color table may be used instead of the default. The recipe 238 may use inheritance to allow re-use of existing color data. For example, the channel map for a prior printer platform may be pushed onto the stack. Next, a scalar modifier table may be pushed onto the stack. Finally, an operator may apply the scalar table to the inherited channel map.

The above examples for specifying the creation and application of transform maps 140 as well as other color management data elements may exist on the supplies (e.g. printer cartridges), may be updated in the supplies, and may be resolved run-time when a customer changes inks or toners. The metadata 230 including tags 234, properties 232, and conditions 236 may allow for versioning and special casing for the permutation of potential changes in printers, inks, and color tables. The tags 234 may also provide references to allow inheritance, where a color data element may be defined as a derivation of a different element. The recipe 238 may specify the construction of color transform data, and also provide a means of specifying the construction of color data that is compactly derived from other data. In one example, the metadata 230 may be compiled into a compact binary symbolic representation prior to storage in the memory device 210.

Figure 3:
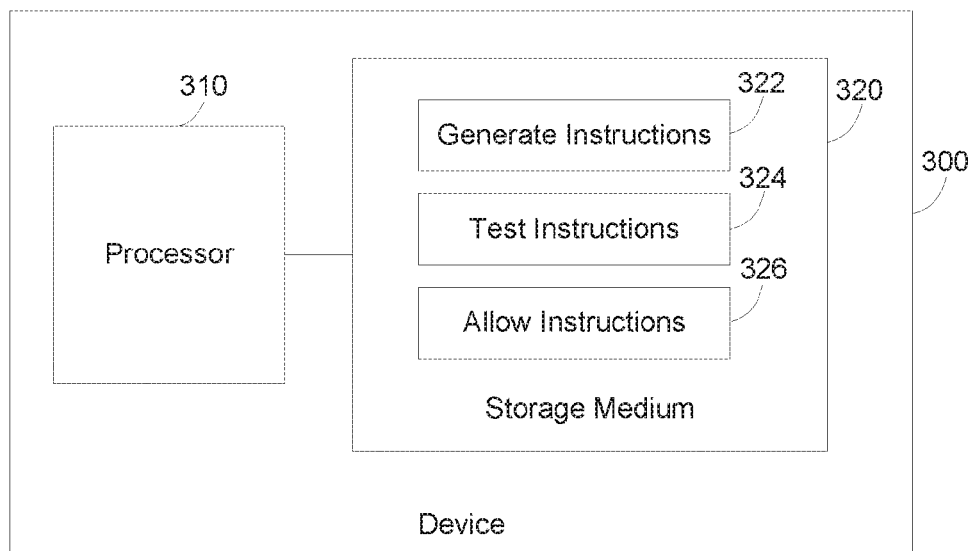
FIG. 3 is an example block diagram of a printer cartridge including instructions for generating a transform map at the printer cartridge.

FIG. 3 is an example block diagram 300 of a computing device including instructions for generating a transform map at a printer cartridge. In the example of FIG. 3, the device 300 includes a processor 310 and a machine-readable storage medium 320. The machine-readable storage medium 320 further includes instructions 322, 324 and 326 for generating a transform map at a printer cartridge.

The computing device 300 may be, for example, a printer cartridge, a printer, a mobile device, a fax machine, multimedia device, a secure microprocessor, a notebook computer, a desktop computer, an all-in-one system, a server, a network device, a controller, a wireless device, or any other type of device capable of executing the instructions 322, 324 and 326. In certain examples, the computing device 300 may include or be connected to additional components such as memories, controllers, etc.

The processor 310 may be, at least one central processing unit (CPU), at least one semiconductor-based microprocessor, at least one graphics processing unit (GPU), a microcontroller, special purpose logic hardware controlled by microcode or other hardware devices suitable for retrieval and execution of instructions stored in the machine-readable storage medium 320, or combinations thereof. The processor 310 may fetch, decode, and execute instructions 322, 324 and 326 to implement generating the transform map at the printer cartridge. As an alternative or in addition to retrieving and executing instructions, the processor 310 may include at least one integrated circuit (IC), other control logic, other electronic circuits, or combinations thereof that include a number of electronic components for performing the instructions 322, 324 and 326.

The machine-readable storage medium 320 may be any electronic, magnetic, optical, or other physical storage device that contains or stores executable instructions. Thus, the machine-readable storage medium 20 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for generating the transform map at the printer cartridge.

Figure 4:
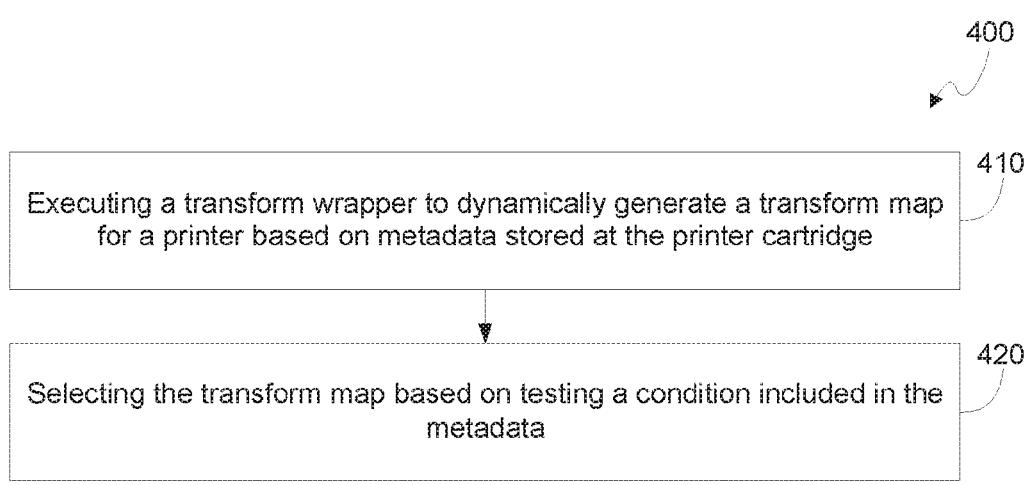
FIG. 4 is an example flowchart of a method for generating a transform map at a printer cartridge.

Moreover, the instructions 322, 324 and 326 when executed by a processor (e.g., via one processing element or multiple processing elements of the processor) can cause the processor to perform processes, such as, the process of FIG. 4. For example, the generate instructions 322 may be executed by the processor 310 to generate a transform map based on a property and a tag included at the printer cartridge (not shown). The test instructions 324 may be executed by the processor 310 to test a condition associated with the transform map and included at the printer cartridge.

The allow instructions 326 may be executed by the processor 310 to allow the transform map to be used by a printer (not shown) if the tested condition is satisfied. The property may describe primitive data stored and/or generated by the printer cartridge. The tag may provide an identification of the printer cartridge. The transform map may be stored at the printer cartridge. A change in the metadata may be communicated from the print cartridge to the printer during run-time, if at least one a type of a depositing material, transform map, print media and printer changes.

FIG. 4 is an example flowchart of a method 400 for generating a transform map at a printer cartridge. Although execution of the method 400 is described below with reference to the printer cartridge 100, other suitable components for execution of the method 400 can be utilized, such as the printer cartridge 200. Additionally, the components for executing the method 400 may be spread among multiple devices. In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the printer cartridge 100 executes a transform wrapper 120 to dynamically generate a transform map 140 for a printer based on metadata 130 stored at the printer cartridge 100. At block 420, the transform map 140 is selected to be used by the printer based on testing a condition included in the metadata 130. The metadata 130 may indicate a type of depositing material, transform map, print media and/or printer. At least one of a plurality of different types of the transform map 140 is generated and used based on a property and tag included in the metadata 130.

We claim:
1. A printer cartridge, comprising:
a memory device to store:
primitive data that comprises a neutral axis, a set of seed nodes, and a delta table;
a transform wrapper to dynamically build a transform map for a printer based on metadata included in the transform wrapper, the transform map to convert input color data into output color data, wherein the metadata indicates a type of depositing material and a type of transform map and wherein the metadata comprises:
a property to describe the primitive data, include a color channel, and include a count of nodes of a color table;
a tag to provide an identification of the printer cartridge and indicate a color space, media type, print quality, printer platform, and supply family for the printer cartridge; and
a condition to restrict when the transform map is available for use;
wherein the transform map comprises a channel map, which channel map is a mapping for one color of a plurality of colors.

2. The printer cartridge of claim 1, wherein the metadata further comprises a recipe that comprises instructions for how to build the transform map from the primitive data.

3. The printer cartridge of claim 2, wherein the recipe comprises instructions to build the channel map based on at least one of the neutral axis, the set of seed nodes, and the delta table included in the primitive data.

4. The printer cartridge of claim 2, wherein the recipe uses a tag to identify components.

5. The printer cartridge of claim 2, wherein the recipe comprises instructions to build a revised transform map based on a modifier map, which is to modify at least one of a base map and the primitive data and a base map, which is to be used without any modification by a printer.

6. The printer cartridge of claim 2, wherein the recipe utilizes a stack model with reverse Polish notation (RPN) operators.

7. The printer cartridge of claim 1, wherein the metadata includes a recipe that comprises instructions to:
select a plurality of channel maps by matching at least one of the property and the tag to the primitive data, and
combine the plurality of channel maps to build a color map.

8. The printer cartridge of claim 1, wherein the condition is set to default.

9. The printer cartridge of claim 1, wherein:
the neutral axis relates to a line extending from an origin of a three-dimensional color table to a node of the color table farthest from the origin;
the set of seed nodes correspond to nodes of a compressed color table; and
the delta table indicates a difference between an interpolated color table node and a corresponding actual color table.

10. The printer cartridge of claim 1, wherein:
the transform map is at least one of a color map and the channel map;
the color map is to convert between a CYMK color model and an RGB color model;
the color map includes a plurality of channel maps and the channel; and
the channel map includes the primitive data.

11. The printer cartridge of claim 10, wherein each of the plurality of channel maps corresponds to one of a plurality of depositing material colors of the printer.

12. The printer cartridge of claim 1, wherein:
the transform map is at least one of a base map and a modifier map;
the base map is to be used without any modification by a printer; and
the modifier map is to be used to modify at least one of the base map and the primitive data.

13. A printer cartridge, comprising:
a memory device to store:
primitive data that comprises a neutral axis; a set of seed nodes, and a delta table;
metadata to build a transform map, the metadata indicating a type of depositing material and a type of transform map, wherein the metadata comprises:
a property to describe the primitive data, include a color channel, and include a count of nodes of a color table;
a tag to provide an identification of the printer cartridge and indicate a color space, media type, print quality; printer platform; and supply family for the printer cartridge:
a condition to restrict when the transform map is available for use; and
a recipe that comprises instructions to build a channel map based on the neutral axis, the set of seed nodes, and the delta table; and
wherein:
the transform map is to convert input color data into output color data;
the transform map comprises the channel map, which channel map is a mapping for one color of a plurality of colors.

14. The printer cartridge of claim 13, wherein:
the neutral axis relates to a line extending from an origin of a three-dimensional color table to a node of the color table farthest from the origin;
the set of seed nodes correspond to nodes of a compressed color table, and
the delta table indicates a difference between an interpolated color table node and a corresponding actual color table.

15. The printer cartridge of claim 14, wherein the recipe comprises instructions to:
select a plurality of channel maps by matching at least one of the property and the tag to the primitive data, and
combine the plurality of channel maps to build a color map.

16. The printer cartridge of claim 13, wherein the recipe includes a modifier map to change node values of a base channel map.

17. The printer cartridge of claim 13, wherein the recipe uses a tag to identify components.

18. The printer cartridge of claim 13, wherein the recipe comprises instructions to build a revised transform map based on a modifier map, which is to modify at least one of a base map and the primitive data and a base map, which is to be used without any modification by a printer.

19. The printer cartridge of claim 13, wherein the recipe utilizes a stack model with reverse Polish notation (RPN) operators.

* * * * *